Oct. 11, 1938.   E. E. HEWITT   2,132,952
DISPLACEMENT VOLUME DEVICE
Filed July 31, 1937
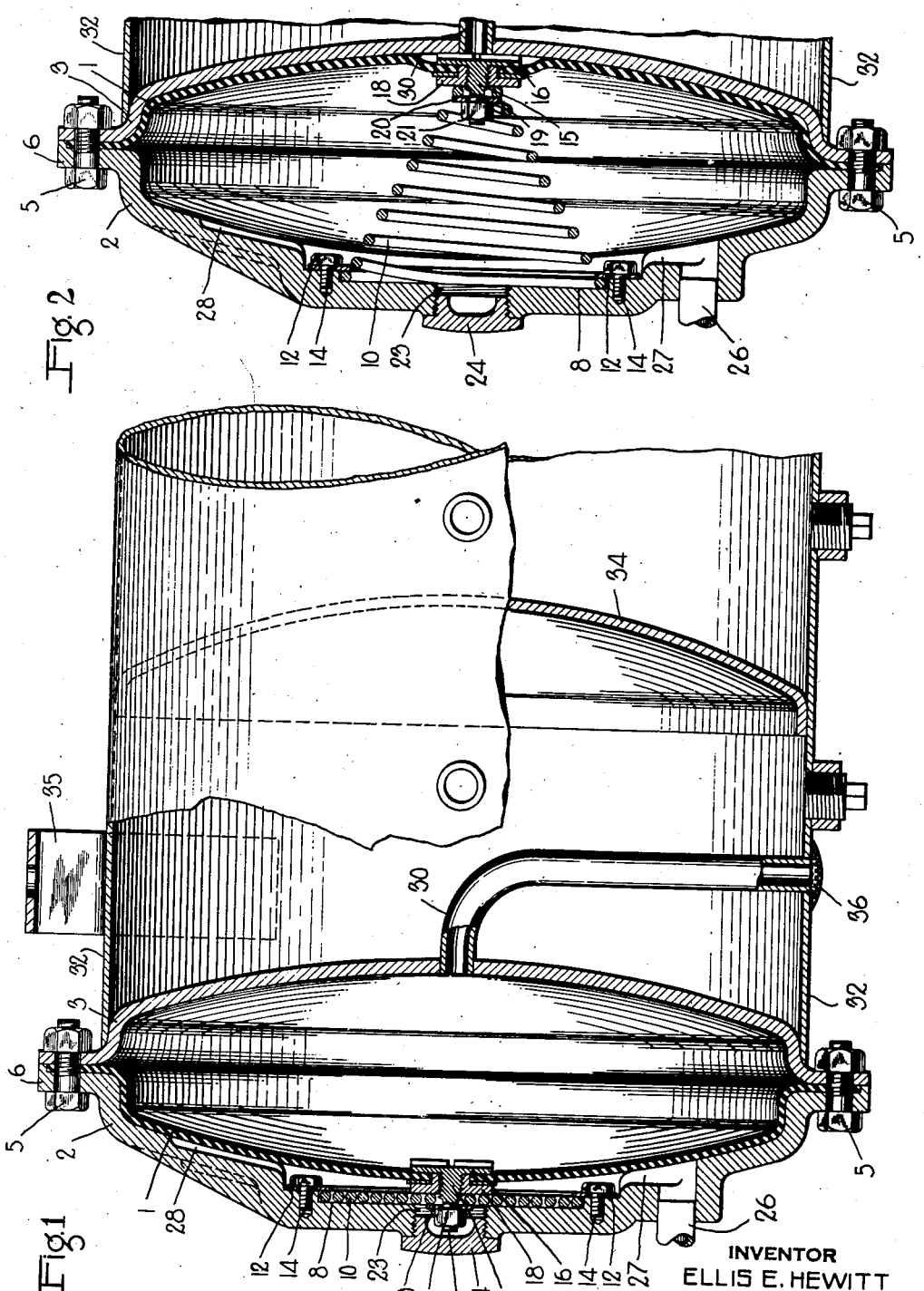
INVENTOR
ELLIS E. HEWITT
BY Wm. M. Cady
ATTORNEY Patented Oct. 11, 1938

2,132,952

UNITED STATES PATENT OFFICE 2,132,952

DISPLACEMENT VOLUME DEVICE

Ellis E. Hewitt, Edgewood, Pa., assignor to The Westinghouse Air Brake Company, Wilmerding, Pa., a corporation of Pennsylvania Application July 31, 1937, Serial No. 156,693

8 Claims. (Cl. 303—1)

This invention relates to a vehicle fluid pressure brake equipment and more particularly to an improved displacement reservoir or volume device for use in brake equipments of the type employed on locomotives, or in which brake application means is provided which is operated on the supply of fluid under pressure to an application chamber to effect the supply of fluid under pressure to a brake cylinder to produce an application of the brakes.

In certain types of brake equipment, such as the brake equipment employed on locomotives, there are provided equalizing valve devices which are similar to the usual triple valve devices employed on cars, and are adapted to supply fluid from a pressure chamber corresponding to the usual auxiliary reservoir to an application chamber, instead of directly to the brake cylinder. An application piston subject to the opposing pressures of the fluid in the application chamber and of the fluid in a brake cylinder then operates to supply fluid under pressure to the brake cylinder from a reservoir, which may be the main reservoir on a locomotive.

When the brake cylinder piston of the usual type of brake equipment is moved in the bore in the brake cylinder from its release position towards the application position by fluid supplied to the brake cylinder by operation of a triple valve device, a certain amount of fluid is required to fill the space created by movement of the piston. The space must be filled with fluid at atmospheric pressure before any effective pressure is exerted on the brake cylinder piston to produce an application of the brakes.

In a brake equipment employing an application piston subject to the pressure of the fluid in an application chamber, the range of movement of the application piston is relatively small with the result that correspondingly little space is created by movement of the piston, and little fluid is required to fill the space so created.

Accordingly on the supply of fluid under pressure from the pressure chamber to the application chamber, when the pressure of the fluid in the pressure chamber is reduced by flow to the application chamber to the pressure to which brake pipe pressure is reduced in effecting an application of the brakes, a higher pressure is developed in the application chamber than is developed in a brake cylinder on the supply of fluid under pressure thereto from an auxiliary reservoir by the usual triple valve device on a corresponding reduction in brake pipe pressure. This higher application chamber pressure will result in the development of a higher pressure in a brake cylinder, such as the brake cylinder on a locomotive, which is supplied with fluid by operation of the application piston than in a brake cylinder on a car in the train hauled by the locomotive and which is supplied by a triple valve device. This produces different degrees of braking on vehicles equipped with different kinds of brake equipment, and causes different rates of retardation of the vehicles with accompanying objectionable slack action in a train composed of such vehicles.

It has heretofore been proposed to provide a piston movable on the supply of fluid under pressure to the chamber at a face thereof to provide a volume corresponding to that created by movement of a brake cylinder piston in a brake cylinder. On the supply of fluid by the equalizing valve device fluid is supplied this chamber as well as to the application chamber, so that the pressure developed in the application chamber builds up at the same rate as the pressure in a brake cylinder increases on the supply of fluid thereto from an auxiliary reservoir. A brake equipment of this type is shown in U. S. Patent No. 1,451,440, issued April 10, 1923 to Clyde C. Farmer.

It is an object of this invention to provide an improved displacement volume device or reservoir adapted for use in a brake equipment of the type described.

A further object of this invention is to provide an improved displacement volume device employing a flexible diaphragm instead of a piston.

Another object of the invention is to provide an improved displacement volume device of the type described in which the diaphragm employed therein is supported over substantially its entire area when the diaphragm is moved from its normal position by fluid under pressure in the chamber at the face thereof.

A further object of the invention is to provide an improved displacement volume device of the type described in which the possibility of leakage of fluid under pressure therefrom is substantially eliminated.

Another object of the invention is to provide an improved displacement volume device of the type described which is adapted to be formed integral with a reservoir employed in the associated fluid pressure brake equipment.

A further object of the invention is to provide an improved displacement volume device of the type described which is simple and rugged in construction.

Other objects of the invention and features of novelty will be apparent from the following description taken in connection with the accompanying drawing, in which Fig. 1 is a fragmentary view, largely in section, of a reservoir having associated therewith a displacement volume device embodying this invention, and Fig. 2 is a fragmentary sectional view showing the diaphragm of the displacement volume device in a different position than that in which it is shown in Fig. 1.

Referring to the drawing, the displacement volume device or reservoir provided by the invention comprises a movable abutment in the form of a diaphragm 1 which is clamped between confronting annular flanges on members 2 and 3, while these flanges are drawn together by bolts 5 which extend through the flanges and through the periphery of the diaphragm. The members 2 and 3 are substantially circular in outline, and have in the confronting faces thereof concave faces which are similar in depth and contour.

The diaphragm 1 may be constructed of any suitable material, such as molded rubber composition having fabric reinforcing material embedded therein, and is formed with its central portion offset and of a shape which conforms to the concave face in the member 2, while the marginal portion of the diaphragm is substantially flat so that it may be clamped between the flanges on the members 2 and 3.

The member 2 may be formed of any suitable material, such as cast metal, while this member has an annular rib or bead 6 thereon which engages the face of the flange on the member 3 to limit movement of the flanges on the members 2 and 3 towards each other, and thereby limit the pressure which can be applied to the material of the diaphragm 1.

The member 2 has substantially centrally thereof a shallow recess 8 in which is mounted a spiral tension spring 10. The spring 10 is proportioned so that the largest convolution thereof will fit within the recess 8, while the spring is constructed so that the convolutions thereof normally nest within each other and assume positions in engagement with the face of the recess 8. A retaining ring 12 is secured to the member 2 by means of cap screws 14 and overlies the outer convolution of the spring 10 to secure the spring in position in the recess 8, and to secure one end of the spring to the member 2.

The diaphragm 1 has a central opening therein through which extends a bolt 15 having an enlarged head 16 which engages one face of the diaphragm. A nut 18 is secured on the bolt 15 and presses against the other face of the diaphragm to seal the opening through which the bolt 15 extends, while the bolt 15 has a reduced end portion indicated at 19 which extends through the smallest convolution of the spring 10. A washer 20 and a nut 21 are mounted on the reduced end portion 19 of the bolt 15 to secure the end of the spring 10 to the bolt 15 and thereby to the diaphragm 1.

The nut 21 and the reduced end portion 19 of the bolt 15 extend into a threaded opening 23 in the member 2, while this opening is closed by means of a threaded cap nut 24.

The member 2 has an opening therein in which is secured a pipe 26 which communicates with the passage through which fluid is supplied by the equalizing valve device to the application chamber, not shown. The pipe 26 communicates with the chamber between the member 2 and the diaphragm 1 at a point outwardly of the spring 10, while the face of the member 2 has a recess, indicated at 27, formed therein to permit fluid to flow freely from the pipe 26 to the area at the face of the diaphragm 1 adjacent the spring 10 when the diaphragm is held against the member 2 by the spring 10. The face of the member 2 also has a plurality of radially extending grooves therein, one of which is indicated at 28, which extend outwardly from the region adjacent the spring 10 to enable fluid under pressure supplied through the pipe 26 to the chamber at the face of the diaphragm 1 to reach enough of the surface area of the diaphragm to cause movement of the diaphragm away from the face of the member 2, and thereby subject the entire surface of the diaphragm to fluid under pressure.

The member 3 has a central opening therein to which is connected one end of a pipe 30, the other end of which is open to the atmosphere.

This displacement reservoir or volume device is shown incorporated in a reservoir having a cylindrical shell 32, one end of which is welded or otherwise secured to the member 3, which serves as one end wall of the reservoir. The other end wall of the reservoir may be formed in any suitable manner.

The shell 32 has a partition wall 34 secured therein and dividing the space within the shell into two chambers adapted to contain fluid under pressure employed in the operation of the brake equipment in which the displacement volume device is incorporated, while the shell 32 has secured thereto a plurality of brackets 35, one of which is shown in the drawing, and which provide means to secure the reservoir to a support.

In the construction shown in the drawing, the atmospheric end of the pipe 30 is secured in an opening in the shell 32, while a screen 36 is secured over the end of this pipe.

In the operation of the displacement volume device, when the brakes are released, the pipe 26 is connected to the atmosphere by operation of the equalizing valve device, not shown, of the brake equipment in which the device is employed. At this time the spring 10 holds the diaphragm 1 in engagement with the face of the member 2, substantially as shown in Fig. 1 of the drawing.

On operation of the equalizing valve device in effecting an application of the brakes, fluid under pressure is supplied thereby from a pressure chamber to a passage through which fluid under pressure may flow to the application chamber, and to the pipe 26 leading to the chamber at the face of the diaphragm 1.

As a result of the supply of fluid under pressure through the pipe 26 to the chamber at the face of the diaphragm 1 there is an increase in the pressure of the fluid in this chamber, and force is exerted upon the diaphragm 1 to move the diaphragm against the spring 10.

The diaphragm 1 is constructed so that it is relatively flexible with the result that it offers little resistance to movement by fluid in the chamber at the face thereof, while the spring 10 is only strong enough to return the diaphragm 1 to the position in which it is shown in Fig. 1, and offers a minimum of resistance to movement of the diaphragm by fluid in the chamber at the face thereof. Accordingly, only a slight increase in the pressure of the fluid in the chamber at the face of the diaphragm 1 is required to move the diaphragm out of engagement with the face of the member 2 from the position in which the diaphragm is shown in Fig. 1 of the drawing to the position in which it is shown in Fig. 2 of the drawing.

As a result of this movement of the diaphragm 1 space is created between the diaphragm 1 and the member 2, and the various parts of the device are proportioned so that the volume of this space is the equivalent of that created by movement of the piston of a brake cylinder from its release position to its application position.

After movement of the diaphragm 1 into engagement with the face of the member 3 further movement thereof is prevented, and on the continued supply of fluid under pressure to the pipe 26 there is an increase in the pressure of the fluid in the chamber between the diaphragm 1 and the member 2, while there is a corresponding increase in the pressure of the fluid in the application chamber which causes the application piston to move to a position to supply fluid under pressure to the brake cylinder.

On an increase in the pressure of the fluid in the chamber between the diaphragm 1 and the member 2, the diaphragm 1 is pressed against the face of the member 3 which serves as a support for the diaphragm 1, and prevents the diaphragm from being injured or overstressed upon an increase in the pressure of the fluid in the chamber at the face thereof to a relatively high value.

As the diaphragm is supported throughout substantially its entire area during the time it is subject to fluid under pressure, the diaphragm may be made relatively thin and flexible so that it will move in response to a small increase in the pressure of the fluid at the face thereof, and so that it will not require a strong spring to return it to its normal position.

In addition, as the diaphragm is supported while it is subject to fluid under pressure, there is no danger that the diaphragm will be ruptured or broken and permit fluid under pressure to escape from the chamber at the face thereof.

Furthermore, as the cavity in the face of the member 3 is substantially the same in depth and cross section as the cavity in the face of the member 2, the central portion of the diaphragm 1, which is offset and proportioned to fit the cavity in the member 2, will extend into and fill the cavity in the face of the member 3 without harmful stretching or deformation of the diaphragm.

On the release of the brakes following an application, the equalizing valve device operates in the usual manner to release fluid under pressure from the pipe 26, thereby reducing the pressure of the fluid in the chamber between the diaphragm 1 and the member 2, while on this reduction in the pressure of the fluid in this chamber to a relatively small value, the spring 10 pulls the diaphragm 1 away from the face of the member 3 and into engagement with the face of the member 2, while the convolutions of the spring 10 nest within each other substantially as shown in Fig. 1 of the drawing. On the return of the diaphragm 1 to the position in which it is shown in Fig. 1, the space between the diaphragm 1 and the member 2 is reduced to a negligible volume.

On movement of the diaphragm 1 towards and away from the member 3, there is a change in the volume of the chamber between these members. The pipe 30 provides means for air to flow freely between this chamber and the atmosphere to thereby prevent objectionable pressure changes in this chamber.

It will be seen that the displacement volume device provided by this invention is of simple construction and is adapted to be associated with a reservoir employed in a fluid pressure brake apparatus.

While one embodiment of the invention has been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a device of the class described, in combination, a rigid member having a concave face thereon surrounded by an annular flange, a flexible diaphragm having its peripheral portion secured against said flange, said diaphragm and said member cooperating to form a chamber adapted to contain fluid under pressure, a communication through which fluid under pressure may be supplied to and released from said chamber, and yielding means exerting force on the diaphragm tending to move said diaphragm towards the face of said member to reduce the volume of said chamber to a minimum, said yielding means comprising a spring mounted in said chamber and having one end secured to said member and having its other end secured to said diaphragm.

2. In a device of the class described, in combination, a rigid member having a concave face thereon surrounded by an annular flange, a flexible diaphragm having its peripheral portion secured against said flange, said diaphragm and said member cooperating to form a chamber adapted to contain fluid under pressure, a communication through which fluid under pressure may be supplied to and released from said chamber, and yielding means exerting force on the diaphragm tending to move said diaphragm towards the face of said member to reduce the volume of said chamber to a minimum, said yielding means comprising a spiral spring mounted in said chamber and having its convolutions arranged to nest within each other, the large end of said spiral spring being secured to said member and the small end of said spiral spring being secured to said diaphragm substantially centrally thereof.

3. In a device of the class described, in combination, a rigid member having a concave face thereon surrounded by an annular flange, a flexible diaphragm having its peripheral portion secured against said flange, said diaphragm and said member cooperating to form a chamber adapted to contain fluid under pressure, said member having a circular recess substantially centrally of said concave face, a spiral spring mounted in said recess, said spring having its convolutions arranged to nest within each other and having its small end secured to said diaphragm substantially centrally thereof, a ring secured to said member and overlying a portion of the largest convolution of said spring to secure the large end of the spring to said member, and a communication through which fluid under pressure may be supplied to and released from said chamber.

4. In a device of the class described, in combination, a pair of rigid members having similar cavities in the confronting faces thereof, each of said members having an annular flange surrounding the cavity therein, a flexible diaphragm having its peripheral portion clamped between the flanges on said members, said diaphragm cooperating with one of said members to form a chamber adapted to contain fluid under pressure, said diaphragm being moved into engagement with and being supported by the other of said members on the supply of fluid under pressure to said chamber, a communication through which fluid under pressure may be supplied to and released from said chamber, and yielding means exerting force on said diaphragm tending to move said diaphragm towards the face of said first named member.

5. In a device of the class described, in combination, a pair of rigid members having similar cavities in the confronting faces thereof, each of said members having an annular flange surrounding the cavity therein, a flexible diaphragm having its peripheral portion clamped between the flanges on said members, said diaphragm cooperating with one of said members to form a chamber adapted to contain fluid under pressure, said diaphragm being moved into engagement with and being supported by the other of said members on the supply of fluid under pressure to said chamber, a communication through which fluid under pressure may be supplied to and released from said chamber, and yielding means exerting force on said diaphragm tending to move said diaphragm towards the face of said first named member, said yielding means comprising a spring mounted in said chamber and extending between said diaphragm and said first named member.

6. In a device of the class described, in combination, a pair of rigid members having similar cavities in the confronting faces thereof, each of said members having an annular flange surrounding the cavity therein, a flexible diaphragm having its peripheral portion clamped between the flanges on said members, said diaphragm cooperating with one of said members to form a chamber adapted to contain fluid under pressure, said diaphragm being moved into engagement with and being supported by the other of said members on the supply of fluid under pressure to said chamber, a communication through which fluid under pressure may be supplied to and released from said chamber, and yielding means exerting force on said diaphragm tending to move said diaphragm towards the face of said first named member, said yielding means comprising a spiral spring mounted in said chamber, said spring having its largest convolution secured to said first named member and having its smallest convolution secured to said diaphragm substantially centrally thereof.

7. In a device of the class described, in combination, a pair of rigid members having similar cavities in the confronting faces thereof, each of said members having an annular flange surrounding the cavity therein, a flexible diaphragm having its peripheral portion clamped between the flanges on said members, said diaphragm cooperating with one of said members to form a chamber adapted to contain fluid under pressure, said diaphragm being moved into engagement with and being supported by the other of said members on the supply of fluid under pressure to said chamber, a communication through which fluid under pressure may be supplied to and released from said chamber, yielding means exerting force on said diaphragm tending to move said diaphragm towards the face of said first named member, and a breather passage through which fluid under pressure may flow between the atmosphere and the area between the diaphragm and the other of said members.

8. In a device of the class described, in combination, a pair of rigid members having similar cavities in the confronting faces thereof, each of said members having an annular flange surrounding the cavity therein, a flexible diaphragm having its peripheral portion clamped between the flanges on said members, said diaphragm cooperating with one of said members to form a chamber adapted to contain fluid under pressure, said diaphragm being moved into engagement with and being supported by the other of said members on the supply of fluid under pressure to said chamber, a communication through which fluid under pressure may be supplied to and released from said chamber, yielding means exerting force on said diaphragm tending to move said diaphragm towards the face of said first named member, said yielding means comprising a spring mounted in said chamber and extending between said diaphragm in said first named member, and a breather passage through which fluid under pressure may flow between the atmosphere and the area between the diaphragm of the other of said members.

ELLIS E. HEWITT.